(12) United States Patent
Cavalet et al.

(10) Patent No.: US 12,479,140 B2
(45) Date of Patent: Nov. 25, 2025

(54) COMPONENT OF APPARATUS AND APPARATUS FOR MOLDING PLASTIC PRODUCTS, IN PARTICULAR WITH THIN WALL THICKNESS

(71) Applicant: S.I.P.A. Società Industrializzazione Progettazione e Automazione S.P.A., Vittorio Veneto (IT)

(72) Inventors: Andrea Cavalet, Ponte Nelle Alpi (IT); Matteo Zoppas, Conegliano (IT)

(73) Assignee: S.I.P.A. SOCIETA' INDUSTRIALIZZAZIONE PROGETTAZIONE, Vittorio Veneto (IT)

( * ) Notice: Subject to any disclaimer, the term of this patent is extended or adjusted under 35 U.S.C. 154(b) by 66 days.

(21) Appl. No.: 18/573,845

(22) PCT Filed: Jun. 27, 2022

(86) PCT No.: PCT/IB2022/055950
§ 371 (c)(1),
(2) Date: Dec. 22, 2023

(87) PCT Pub. No.: WO2023/275713
PCT Pub. Date: Jan. 5, 2023

(65) Prior Publication Data
US 2024/0383179 A1    Nov. 21, 2024

(30) Foreign Application Priority Data

Jun. 30, 2021   (IT) ..................... 102021000017171

(51) Int. Cl.
*B29C 45/30* (2006.01)
*B29C 45/26* (2006.01)
(Continued)

(52) U.S. Cl.
CPC ............ *B29C 45/261* (2013.01); *B29C 45/36* (2013.01); *B29C 2045/4078* (2013.01); *B29L 2023/22* (2013.01); *B29L 2031/7544* (2013.01)

(58) Field of Classification Search
CPC ... B29C 45/2606; B29C 45/261; B29C 45/36; B29C 45/40; B29C 45/80; B29C 2045/4078; B29C 33/304
See application file for complete search history.

(56) References Cited

U.S. PATENT DOCUMENTS

2019/0283298 A1   9/2019  Mühlemann
2022/0234270 A1*  7/2022  Mühlemann ............ B29C 45/36

FOREIGN PATENT DOCUMENTS

CN      2403567 Y    11/2000
CN    203831732 U     9/2014
(Continued)

OTHER PUBLICATIONS

International Search Report and Written Opinion for PCT/IB2022/055950, dated Oct. 25, 2022.

*Primary Examiner* — Thu Khanh T. Nguyen
(74) *Attorney, Agent, or Firm* — Troutman Pepper Locke LLP

(57) ABSTRACT

A component (100, 100') of a molding apparatus (110, 110') for producing hollow plastic items, in particular test tubes, syringes or tubular bodies, the component (100, 100') comprising: —a first body (1,1") having a face (11) defining part of a separation surface of the molding apparatus (110, 110'); —a second body (2, 2'), or stripper ring, inserted in the first body (1, 1'), adapted to be crossed along an axis (X) by a core (3), and in particular to come into contact with the core (3); —a plurality of elements (4, 4') inserted in the first body (1, 1'), adapted to be displaced parallel to the axis (X); in which the second body (2, 2') has an outer surface (20) comprising a plurality of inclined portions (21, 21'), in (Continued)

particular with respect to said axis (X); and in which each element (4, 4') of said plurality of elements (4, 4') has an outer surface comprising an inclined portion (41, 41'), in particular with respect to said axis (X), which is in contact with a respective inclined portion (21, 21') of the second body (2, 2') so that the position of the second body (2, 2') can be adjusted by means of said plurality of elements (4, 4').

20 Claims, 10 Drawing Sheets

(51) Int. Cl.
    *B29C 45/36*     (2006.01)
    *B29C 45/40*     (2006.01)
    *B29L 23/00*     (2006.01)
    *B29L 31/00*     (2006.01)

(56) References Cited

FOREIGN PATENT DOCUMENTS

| | | |
|---|---|---|
| EP | 0076980 A2 | 4/1983 |
| JP | H0588925 U | 12/1993 |
| WO | 2017215801 A1 | 12/2017 |
| WO | 2020234065 A1 | 11/2020 |

\* cited by examiner

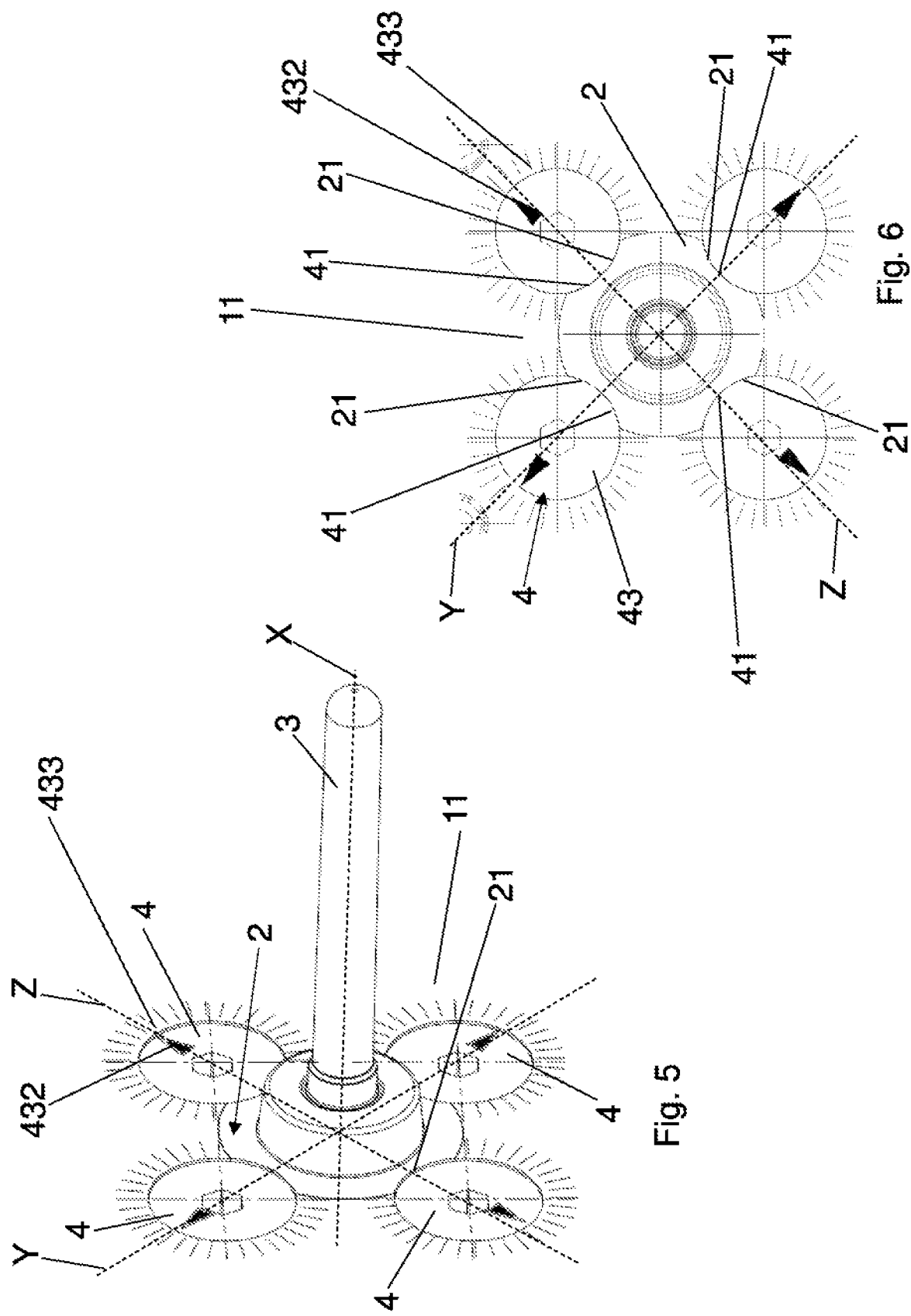

COMPONENT OF APPARATUS AND APPARATUS FOR MOLDING PLASTIC PRODUCTS, IN PARTICULAR WITH THIN WALL THICKNESS

This application is a national stage application under 35 U.S.C. § 371 of PCT Application No. PCT/IB2022/055950, filed Jun. 27, 2022, which claims the priority benefit of Italy Patent Application No. 102021000017171, filed Jun. 30, 2021.

FIELD OF THE INVENTION

The present invention relates to the field of molding plastic items, in particular hollow items, having thin wall thickness, such as for example test tubes, syringes, preforms of containers or other tubular bodies.

In particular, the invention relates to a component which allows adjusting the position of the core, a molding apparatus in which the position of the core can be adjusted, and a method for adjusting the position of the core.

BACKGROUND ART

During the molding of hollow plastic items with a thin wall, the uniformity of the thickness of the wall is very important. Indeed, a small deviation of the thickness of the wall can result in a significant deformation of the molded item due to the volumetric shrinkage.

The position of the core (male part or punch) is a decisive factor in order to obtain items with uniform wall thickness.

A possible, even minimum, off center can be emphasized during the injection step and result in an item being produced with a thickness delta (that is a difference in wall thickness with respect to the design thickness) which can become significant, thus accordingly inducing such deformations as to make the molded product non-conforming.

In order to obtain a uniform wall thickness, the position of the core is to be aligned, or in other words, centered, with the female component (cavity).

The individual centering of each core is important to achieve such an object.

Given that it is far from alignment elements, the tip of the core (substantially in the shape of spherical cap), which is close to the injection point, can move away from the condition of perfect centering when stressed with even small loads. Therefore, the molten material can fill the annular section between the core and the cavity in inhomogeneous manner, such as for example shown in FIGS. 1A, 1B, where Bmax and Bmin indicate the wall thickness of the molded item in mutually opposite areas, with Bmax>Bmin. Under such conditions, the pressures that would be applied inside the cavity could be greater on the side where the thickness is greater (Bmax). Indeed, where the thickness is greater, the material is hotter and therefore more fluid, and the pressure is greater, thus determining a further increasing inflexion. Where the thickness is thinner (Bmin), the material is colder, therefore more viscous, and thus there is less pressure.

Therefore, the need is felt to solve the problem of the correct centering of the core with the cavity in apparatuses for molding hollow plastic items having thin wall thickness.

Document US2019283298A1 discloses a molding apparatus which provides the possibility of adjusting the position of the core. However, such an apparatus has disadvantages. Indeed, in order to make the adjustment, there is a need to insert or remove adjustment films. Moreover, the adjustment is made at the base of the core, the latter being the area where the core is fixed in position. In particular, the base of the core is constrained to the core-support plate. Therefore, disadvantageously, the application point of the force applied in order to adjust the position of the core tip (axially opposite to the core base), disadvantageously, is very close to the base of the core. Moreover, disadvantageously, it is not easy to make the adjustment at the core base, in particular due to the difficult accessibility.

SUMMARY OF THE INVENTION

It is an object of the present invention to allow avoiding or minimizing the decentering of the core in a molding apparatus of plastic items, in particular hollow items having thin wall thickness.

In particular, it is an object of the present invention to allow an adjustment of the position of the core to be made in any easy manner, in particular in an easy and accurate manner.

More specifically, it is an object of the invention to allow the adjustment of the position of the core to be made without the need to insert or remove adjustment films.

The present invention achieves at least one of such objects, and other objects which will be apparent in light of the present description, by means of a component of a molding apparatus for producing plastic items, in particular hollow items, for example test tubes, syringes, preforms of containers (for example, preforms of bottles) or tubular bodies, the component comprising:
- a first body, in particular having a face defining part of a separation surface of the molding apparatus, said face preferably being adapted to face a cavity-support plate of the molding apparatus;
- a second body, or stripper ring, inserted (or arranged) in the first body, adapted to be crossed along an axis X by a core, and in particular to come into contact with the core;
- a plurality of elements inserted (or arranged) in the first body, adapted to be displaced parallel to said axis X;

wherein the second body has an outer surface comprising a plurality of inclined portions, in particular with respect to said axis X;

and wherein each element of said plurality of elements has an outer surface comprising an inclined portion, in particular with respect to said axis X, which is in contact with a respective inclined portion of the second body so that the position of the second body can be adjusted by means of said plurality of elements.

The invention also relates to a molding apparatus, in particular according to claim 20.

The invention also relates to a method for adjusting the position of at least one core, in particular according to original claim 26.

The second body is adapted to displace the core when it is inserted therein, whereby the position of the core is adjusted by adjusting the position of the second body.

In other words, when the core is inserted in the second body, a displacement of the second body corresponds to a displacement of the core.

In particular, when the core is inserted in the second body, the latter is adapted to transmit the movement, in particular the radial movement imparted thereto by the adjustment elements, to the core.

Advantageously, the adjustment of the position of the second body, and therefore of the core, is made by means of a displacement of said elements parallel to axis X. In particular, advantageously the elements still remain inserted in the first body.

In particular, the adjustment of the position of the second body by means of an axial displacement (parallel to axis X) of said elements is obtained in particular by means of the inclined surface portions of the elements and the corresponding inclined surface portions of the second body; in particular, the elements remain in the first body during said axial displacement.

Advantageously, an adjustment, in particular a micrometric adjustment, of the position of each core can be made in an apparatus provided with the aforesaid component.

Thus, the aforesaid problem related to the non-uniform wall thickness can be avoided or minimized.

Preferably and advantageously, in all the embodiments, each element is accessible, in particular in order to be displaced parallel to the aforesaid axis X, from the side of said face, which is adapted to face the cavity-support plate of the molding apparatus, in particular to come into contact with the cavity-support plate.

The arrangement of the aforesaid elements, or adjustment elements, has been accurately selected.

Advantageously, the adjustment by means of said elements can be made on the side of the aforesaid face (that is, on the side of the aforesaid separation surface), in particular by acting directly on the elements or on a component connected to a respective element. For example, a user can have access to said elements, or to said component connected to a respective element, from the side of said face.

Advantageously, the aforesaid adjustment of the position of the core(s), in particular of each single core requiring said adjustment, can be easily made without the need to disassemble components of the apparatus and without the need to insert adjustment films.

The adjustment advantageously can be made when the mold (or the molds) is in an opening position.

For example, a radial displacement (orthogonally to axis X) of the second body, and therefore of the core inserted therein, can be obtained by axially (parallel to axis X) displacing pairs of opposite elements.

Advantageously, a radial movement of the second body and of the core inserted therein is obtained by acting on opposite elements, by displacing them axially in opposite direction by a same amount.

Movements in the various directions can be obtained by combining different movements of the adjustment elements, which preferably are four or at least four in number.

Further features and advantages of the invention will become more apparent in the light of the detailed description of exemplary but not exclusive embodiments.

The dependent claims describe particular embodiments of the invention.

BRIEF DESCRIPTION OF THE FIGURES

In the description of the invention, reference is made to the accompanying drawings, which are provided by way of non-limiting example, in which:

FIG. 5 shows a perspective view of some parts of the apparatus in FIG. 1;

FIG. 6 shows a top plan view of the parts shown in FIG. 5;

The same elements or components have the same reference numerals.

DESCRIPTION OF EXEMPLARY EMBODIMENTS OF THE INVENTION

Figure 1:
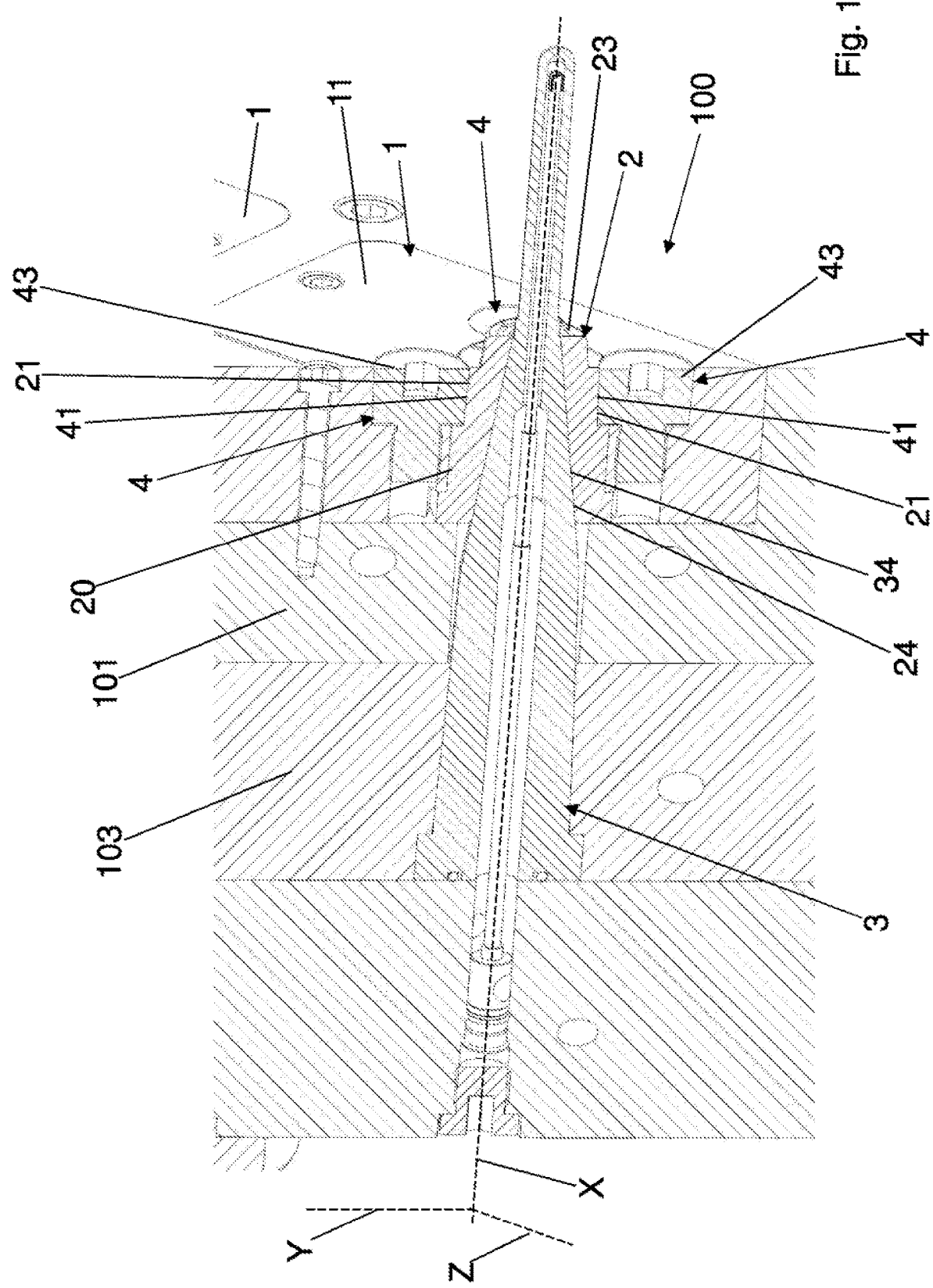
FIG. 1 shows a perspective sectional view of some parts of an apparatus according to the invention.
Figure 1B:
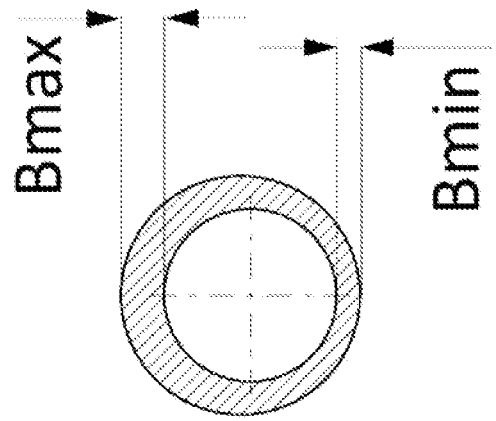
FIGS. 1A and 1B are diagrammatic sectional views showing a problem related in particular to known molding apparatuses.
Figure 1A:
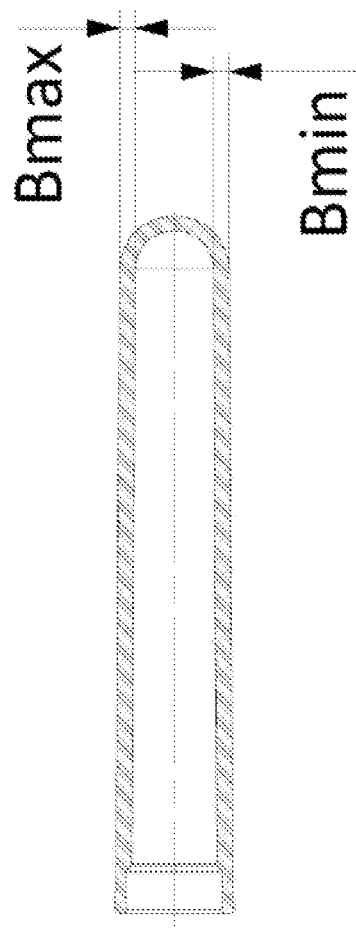
Figure 2:
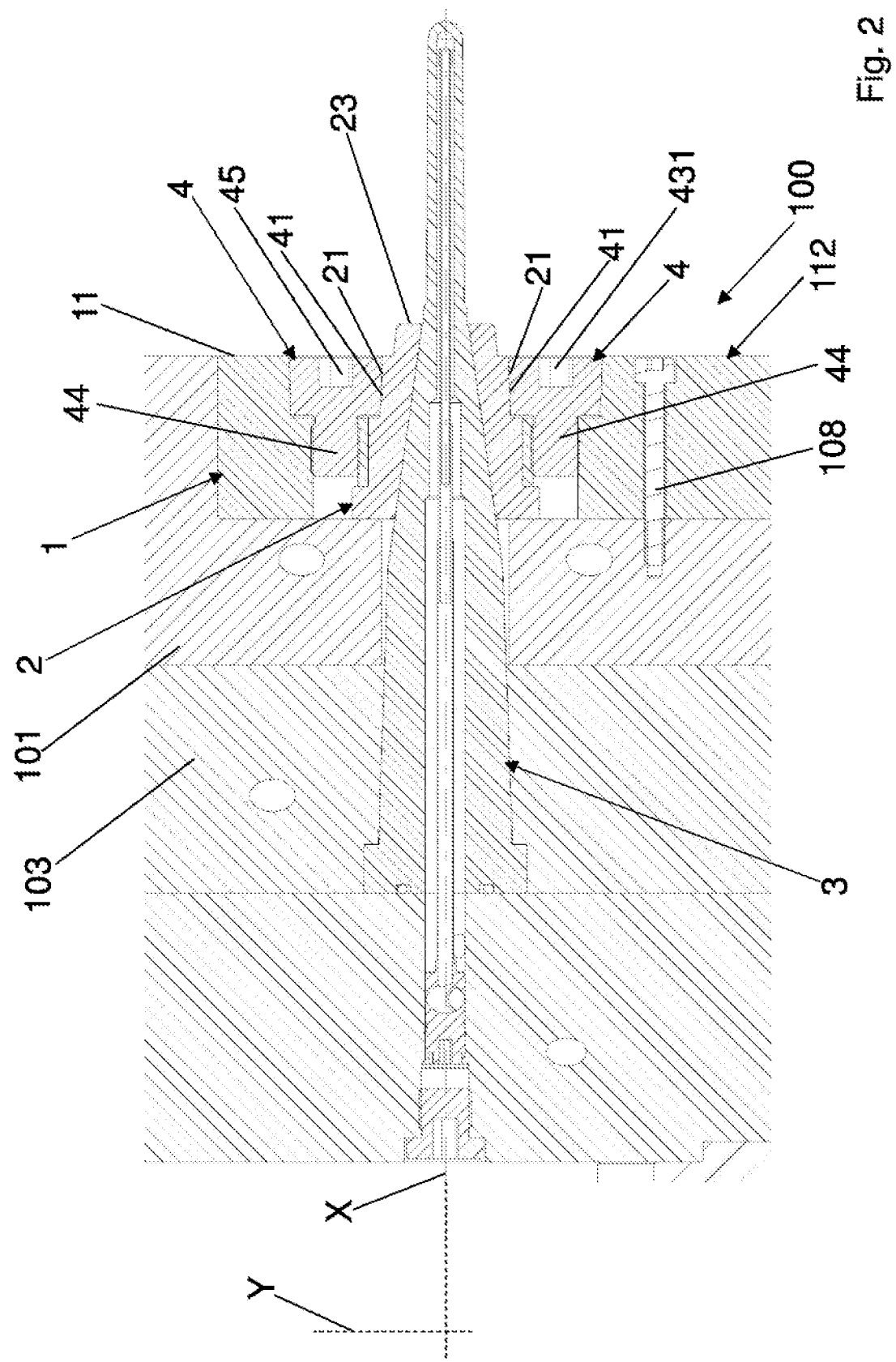
FIG. 2 shows a sectional view of parts of the apparatus in FIG. 1.
Figure 3:
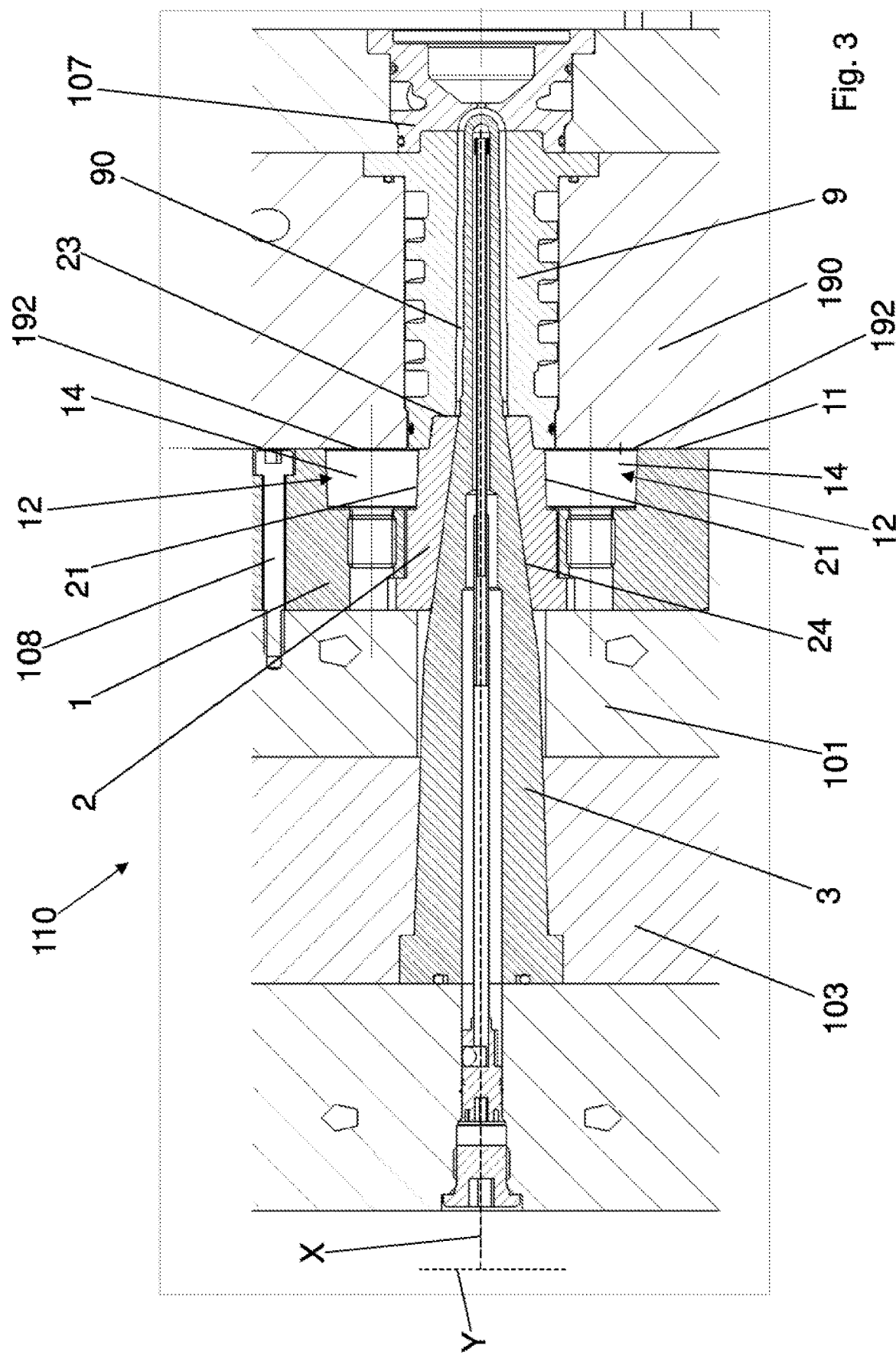
FIG. 3 shows a sectional view of parts of the apparatus according to the invention.

With reference to FIGS. 1 to 10, non-limiting exemplary embodiments of a component 100, 100', 100" and of a molding apparatus 110, 110' according to the invention are described.

The molding apparatus 110, 110' is an apparatus for producing plastic items (for example, PET) in particular hollow items. The molded items in particular have a thin wall thickness, in particular from 0.5 to 2.5 mm, or from 0.5 to 1.5 mm, or from 0.8 to 1.5 mm. Non-limiting examples of items which can be produced by means of the apparatus are: test tubes, syringes, preforms of containers, for example preforms of bottles, or tubular bodies.

In all the embodiments, component 100, 100', 100" comprises:
 a body 1, 1', 1" (or first body) having a face 11 defining part of a separation surface of the molding apparatus 110, 110';
 a body 2, 2' (or second body), or stripper ring or stripping ring, inserted in body 1, 1', adapted to be crossed along an axis X by a core 3, and in particular to come into contact with core 3;
 a plurality of elements 4, 4' inserted in body 1, 1', adapted to be displaced parallel to axis X;
wherein body 2, 2' has an outer surface 20 comprising a plurality of inclined portions 21, 21', in particular inclined with respect to said axis X;
and wherein each element 4, 4' of said plurality of elements 4, 4' has an outer surface (in particular, outer side surface) comprising an inclined portion 41, 41', in particular with respect to said axis X, which is in contact with a respective inclined portion 21, 21' of the second body 2, 2' so that the position of body 2, 2' can be adjusted, in particular orthogonally to axis X, by means of said plurality of elements 4, 4'.

Said separation surface 112 is also called parting surface.

In particular, said separation surface 112 is a separation surface with a cavity-support plate 190 of the molding apparatus 110, 110'.

Body 2, 2' and core 3 in particular are distinct components from each other.

Body 2, 2' in particular is an annular body. In particular, body 2, 2' also has an inner surface 24, in particular opposite to said outer surface 20. The outer surface 20 in particular is an outer side surface.

The aforesaid axis X in particular is the axis around which body 2, 2' extends, more specifically around which the outer surface 20 and the inner surface 24 extend. Face 11 and axis X preferably are orthogonal to each other.

The axes Y and Z are orthogonal to each other and to axis X.

The aforesaid adjustment of the position of body 2, 2', and of core 3 when it is inserted therein, in particular is made parallel to plane Y-Z.

When core 3 is inserted in body 2, 2', core 3 is displaced, in particular it translates, with body 2, 2'.

It is preferable that the body 2, 2' be able to come into contact, preferably directly in contact, with core 3. In particular, the inner surface 24 can preferably come into contact with core 3.

Preferably, core 3 comprises a frustoconical portion 34 in contact with the inner surface 24 of the second body 2, 2'; the inner surface 24 therefore is preferably frustoconical.

Body 2, 2' is preferably adapted to slide the molded item over core 3, in particular to perform an extraction thereof. In other words, body 2, 2' is preferably a stripper ring. Body 2, 2', or stripper ring, in particular is adapted to be displaced parallel to axis X with respect to core 3 so as to slide the molded item with respect to core 3.

In particular, body 2, 2', or the stripper ring, comprises a portion 23 adapted to come into contact with the molded item to slide it over core 3. Said portion 23 preferably projects with respect to body 1, 1', in particular projects with respect to said face 11. The elements 4, 4', 4" in particular are arranged around body 2, 2', preferably they are arranged evenly around body 2, 2'.

Preferably, the elements 4, 4', 4" are in contact both with the first body 1, 1', 1" and with the second body 2, 2'.

The aforesaid plurality of elements 4, 4', 4" preferably comprises or consists of four elements 4, 4', 4" (there are four in the illustrated examples) arranged at the vertexes of a quadrilateral, in particular of a square or a rhombus.

In particular, considering a first plane (in particular, X-Y) and a second plane (in particular, X-Z), orthogonal to each other and both containing axis X, the aforesaid four elements 4, 4' preferably are arranged as follows:

two of the four elements 4, 4' are opposite to each other with respect to the first plane, preferably arranged symmetrically with respect to the first plane;

and the other two of the four elements 4, 4' are opposite to each other with respect to the second plane, preferably arranged symmetrically with respect to the second plane.

Advantageously, by displacing two opposite elements 4, 4' parallel to axis X, a displacement is obtained orthogonally to axis X (or radial displacement) of body 2, 2' and of core 3 inserted therein. Said displacement orthogonal to axis X can in particular be along a direction parallel to axis Y or axis Z, as a function of the pair of opposite elements 4, 4' on which action is taken. Advantageously, the position of body 2, 2' can be adjusted both parallel to axis Y and parallel to axis Z.

Said displacement orthogonal to the axis X of body 2, 2' (and therefore of core 3) is preferably micrometric, for example up to 0.2 mm.

The displacement of body 2, 2' is obtained in particular by displacing two opposite elements 4, 4' parallel to axis X, in opposite direction from each other. The entity of the displacement of the two elements 4, 4', 4" is substantially the same.

The adjustment of the position of body 2, 2' by means of an axial displacement (parallel to axis X) of the elements 4, 4', 4" is obtained in particular by means of the inclined surface portions 41, 41' of the elements 4, 4' and the corresponding inclined surface portions 21, 21' of body 2, 2'; in particular, during said axial displacement, the elements 4, 4', 4" remain in body 1, 1', 1", in particular they remain constrained thereto.

The inclined portions 21, 21' of body 2, 2' and each inclined portion 41, 41' of each element 4, 4' have a same tilt angle, in particular with respect to said axis X. The tilt angle in particular is different from 90°, more specifically it is less than 90°. Preferably, said tilt angle is from 2 to 10°.

Each inclined portion 21, 21' in particular is parallel to the respective inclined portion 41, 41' in contact therewith.

It is apparent that the number of inclined portions 21, 21' is equal to the number of elements 4, 4'. In particular, body 2, 2' is provided with at least two pairs of inclined portions 21, 21'; the inclined portions 21, 21' of each pair being opposite to each other.

Each element 4, 4' is inserted in a hole 12, in particular in a respective hole 12, of the face 11 of body 1, 1', in particular through a respective opening of face 11. Each opening of face 11 allows a user to make an adjustment of the position of a respective element 4, 4'.

Advantageously, the adjustment can be made on the side of face 11, in particular by directly acting on the elements 4 or on a component 5' connected to a respective element 4' (as will be explained in greater detail).

Indicator means preferably are provided, which allow displaying the entity of the adjustment made; said indicator means for example comprise an arrow or notch and possibly a graduated scale (as will be explained in greater detail).

Optionally, component 100, 100' can comprise a stripper plate 101 and said elements 4, 4', 4" are arranged between the stripper plate 101 and said second body 2, 2' along a radial direction with respect to axis X, or more generally, they are arranged in the stripper plate 101. Preferably, said first body 1, 1', 1" is arranged in said stripper plate 101 or said first body 1, 1', 1" is (that is, it coincides with) said stripper plate 101. The stripper plate 101 in particular is the plate to which one or more stripper rings 2, 2' are integrally fastened. The stripper plate 101 in particular is adapted to face the cavity-support plate 190, more specifically it is adapted to come into contact with the cavity-support plate 190.

In all the embodiments, in order to adjust the position of body 2, 2', it is particularly preferable for body 2, 2' to be mounted in body 1, 1' (that is, it is constrained to body 1, 1') in floating manner, in particular slightly floating manner.

Figure 4:
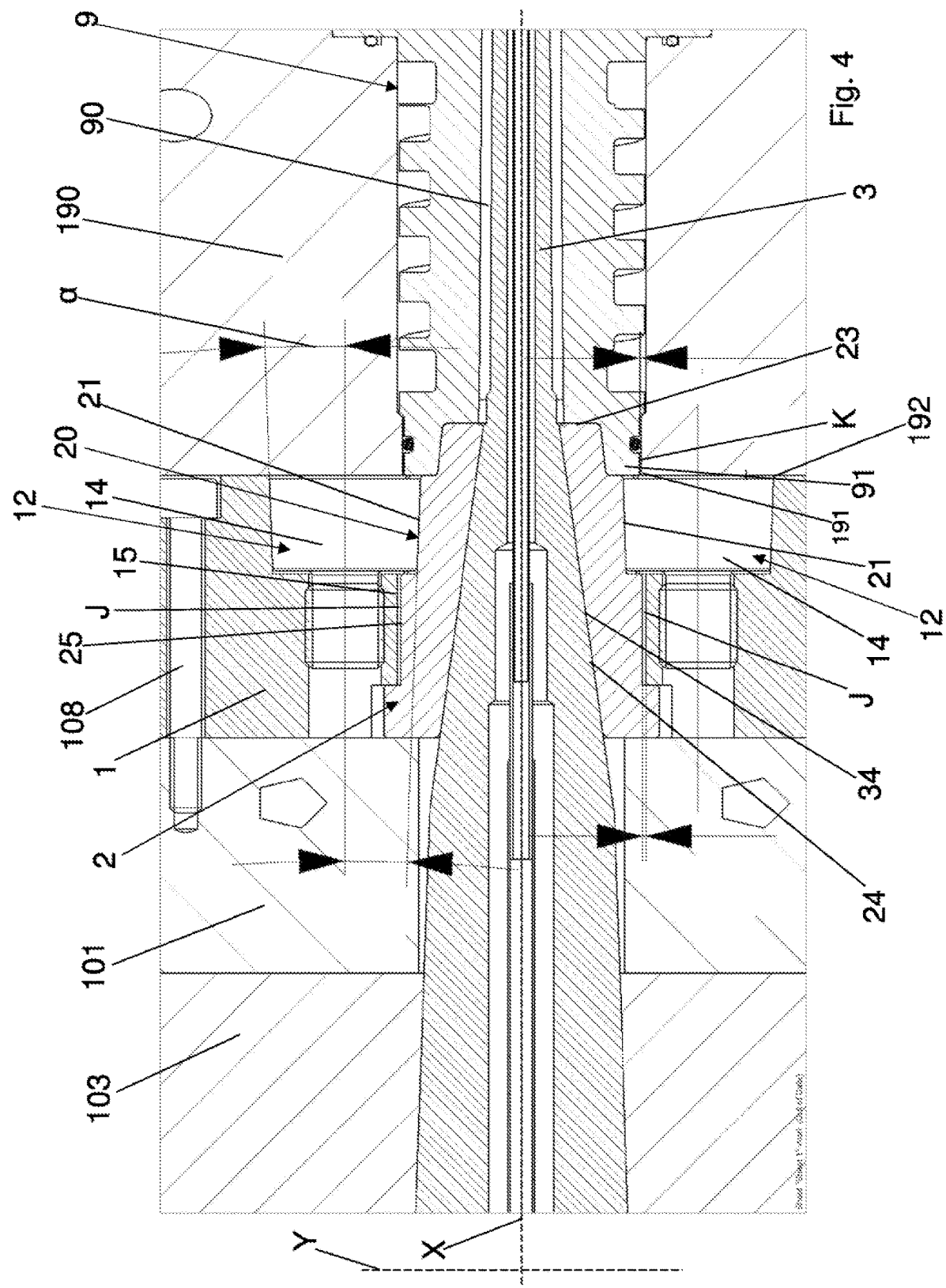
FIG. 4 shows a detail of FIG. 3.

More specifically, a clearance is provided, in particular a radial clearance (orthogonally to axis X), indicated by way of example in FIG. 4 by reference numeral J. Clearance J is preferably provided between a portion 25 of the outer surface 20 of body 2, 2' and a surface 15 of body 1, 1' extending around portion 25 and facing the latter.

Preferably, the inclined portions 21, 21' are between portion 23 and portion 25. Optionally, portion 25 is substantially cylindrical and/or surface 15 is substantially cylindrical. Preferably, portion 25 radially projects with respect to the inclined portions 21, 21'.

Considering apparatus 110, 110', the latter comprises a cavity-support plate 190 which has a face 192 facing said face 11 of component 1, in particular adapted to come into contact with said face 11 of body 1, 1'.

Apparatus 110, 110' also comprises at least one body 9 (preferably a plurality of bodies 9) which delimits a molding cavity 90 in which a respective core 3 can be inserted. Body 9 is also called cavity insert and is adapted to mold at least part of the outer surface of the item to be produced. Said at least one body 9 is arranged in the cavity-support plate 190.

The distance, in particular the radial distance, between core 3 when inserted in the molding cavity 90 and the inner surface of body 9 defines the wall thickness of the molded item.

Preferably, said distance is from 0.5 to 2.5 mm, or from 0.5 to 1.5 mm, or from 0.8 to 1.5 mm.

Additionally to the aforesaid floating mounting of body 2, in order to allow body 9 to follow the displacement of body 2, it is particularly preferable that also said at least one body 9 be mounted in the cavity-support plate 190 with a clearance (indicated by way of example by reference numeral K in FIG. 4). In other words, a clearance K, in particular a radial clearance K, is provided between said at least one body 9 and plate 190 in which it is mounted.

In particular, said clearance K is preferably provided between the end portion 91 of body 9 proximal to body 1, 1' and an annular portion 191 of the cavity-support plate 190 which surrounds said portion 91.

Said annular portion 191 in particular is provided in an area proximal to body 1, 1'. Said annular portion 191 of the cavity-support plate 190 in particular is transverse, for example orthogonal, and preferably adjacent to the face 192 of plate 190 facing the face 11 of body 1, 1'.

Preferably, the portion 23 of body 2 can be inserted in the end portion 91 of body 9.

In the example shown in FIGS. 1 to 6, each element of said plurality of elements 4, 4' is a screw 4 screwed in the first body 1.

In particular, each screw 4 comprises a frustoconical head 43 (outwardly convex), that is the outer side surface of head 43 is frustoconical. The outer side surface of head 43 defines said inclined portion 41 of the outer surface of screw 4. The outer side surface of head 43 of each screw 4 extends around a respective axis parallel to axis X.

Head 43 is frustoconical preferably so as to have a greater outer diameter close to face 11 (and therefore a smaller outer diameter distal from face 11).

Each screw 4 also comprises a threaded shank 44 screwed in a corresponding threaded portion, preferably of body 1. rotation of each screw 4, in particular around a respective axis parallel to axis X, corresponds to a displacement of screw 4 parallel to axis X.

The aforesaid adjustment of the position of core 3, for example, can be made by unscrewing a first screw 4 and screwing a second screw 4, opposite to the first screw 4, thus determining a displacement of body 2 and of core 3 therein parallel to axis Y or parallel to axis Z.

Each screw 4 is inserted in a hole of the face 11 of body 1, in particular through a respective opening of face 11.

Advantageously, the adjustment can be made by acting on the elements 4 on the side of face 11. In particular, in order to displace a screw 4 parallel to axis X, a wrench can be inserted, for example a hexagon wrench, in a corresponding seat 431 present in the head 43 of each screw 4.

It is preferable that the head 43 of each screw 4 define part of said separation surface of the molding apparatus 110.

Preferably, the screws 4 constrain body 2 to body 1.

The frustoconical head 43 of each screw 4 in particular is inserted in a respective seat 14 (FIG. 4). The side wall of each seat 14 is partially defined by a respective inclined portion 21 of the second body 2, and preferably partially by said body 1.

For each seat 14, the aforesaid lateral wall delimiting it extend around a respective axis parallel to axis X.

The aforesaid side wall of seat 14 is preferably parallel to the outer side surface of head 43.

In particular, the larger inner diameter of the side wall of seat 14 is proximal to face 11.

The aforesaid side wall of seat 14 is preferably frustoconical.

Advantageously, thereby, the (inclined) surface portion of body 1, opposite to a respective (inclined) surface portion 21 of body 2, allows the reaction forces to be unloaded.

FIG. 4, shows the tilt angle α with respect to axis X. Said angle α is the same for the frustoconical wall delimiting seat 14 (and therefore, also for the inclined portion 21) and for the frustoconical side surface of the head 43 of screw 4.

Each of the inclined portions 21 of body 2 is preferably a recessed surface portion (that is, forming a recess) of body 2.

In particular, each of the inclined portions 21 of body 2 is preferably a frustoconical surface portion, in particular concave towards the outside of body 2.

Opposite pairs of inclined portions 21 in particular converge with each other in a direction which goes towards the face 11 of body 1. The frustoconical side wall (or surface) delimiting seat 14 widens towards face 11.

With particular reference to FIGS. 5 and 6, each screw 4 is preferably provided with an arrow 432 or a notch on head 43, in particular on the surface of the head visible from the side of the face 11 of body 1. A respective graduated scale 433 is provided for each screw 4. For example, the face 11 of body 1 is provided with a graduated scale 433 for each screw 4. An indication of the entity of the adjustment of the position of core 3 with respect to the graduated scale 433 is provided as a function of the position of arrow 432, which varies by rotating screw 4.

In the examples shown, in FIGS. 7-8 and 9-10, respectively, each element 4', 4" has an inner thread, that is it is a body having an inner thread. In particular, each element 4', 4" is provided with a through hole; the inner surface delimiting said through hole is provided with said thread and extends around a respective axis parallel to axis X.

A respective screw 5' is inserted in each element 4', 4". Each screw 5' crosses the respective element 4', 4".

Each screw 5' in particular is adapted to operate as worm-screw so that a rotation of each screw 5' corresponds to a displacement of a respective element 4', 4" parallel to said axis X.

The end portion 52' (proximal to face 11) of each screw 5' is shaped so as to engage with a tool with which screw 5' can be rotated. For example, said end portion 52' is shaped like a polyhedron, for example it is hexagonal.

Preferably, there is an arrow 532' (FIG. 8) on the end portion 52', and preferably a graduated scale (not shown) is provided on a surface of each element 4', 4". An indication of the entity of the adjustment of the position of core 3 is provided as a function of the position of arrow 532', which varies by rotating screw 5'.

Advantageously, the adjustment can be made on the side of face 11, in particular by acting on the screws 5'.

Each element 4', 4" has a plurality of (outer) faces, in particular side faces, for example four faces, one of which face defining said inclined portion 41'. The four faces in particular are two-by-two opposite to each other.

Figure 7:
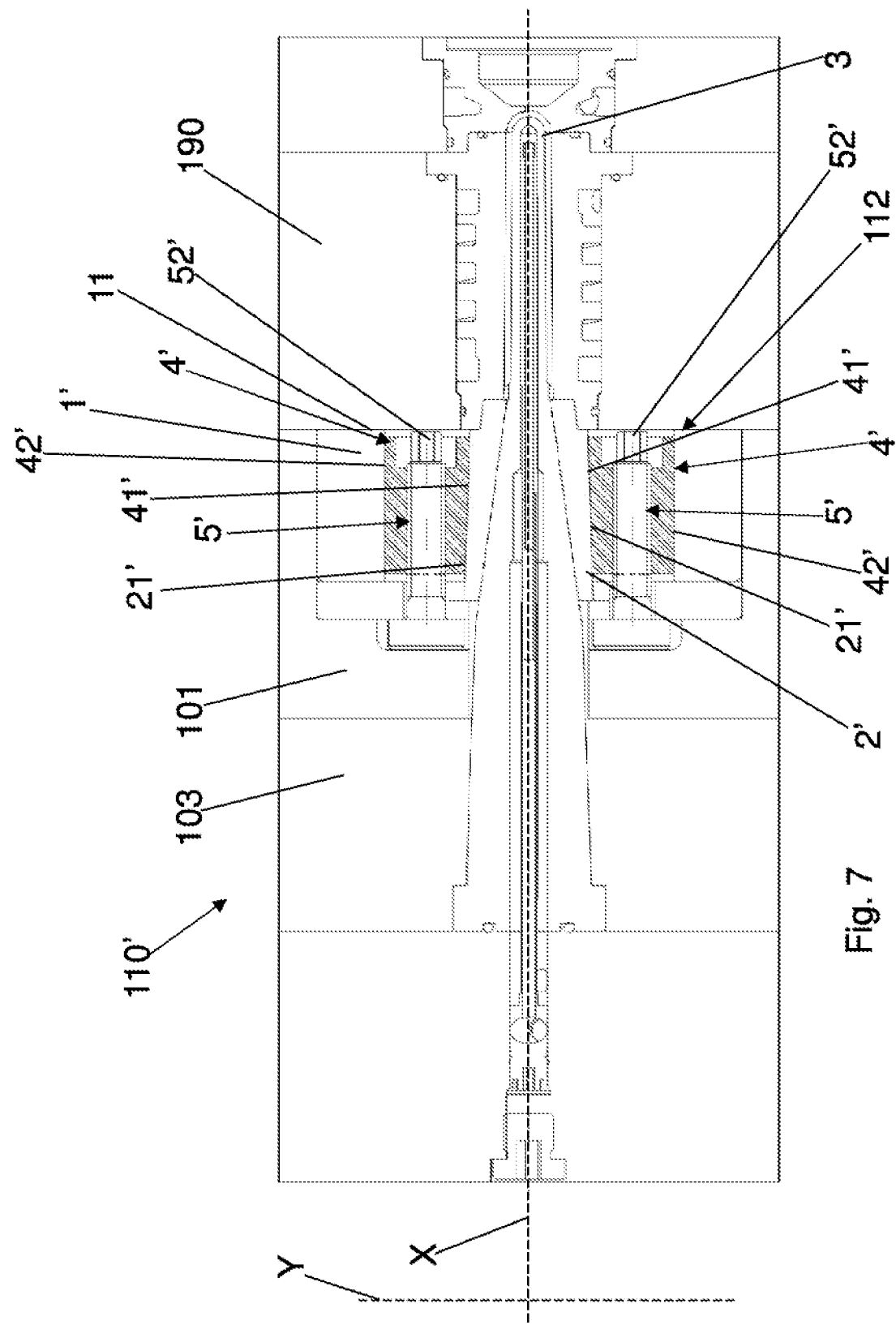
FIG. 7 shows a sectional view of some parts of another example of apparatus according to the invention.
Figure 8:
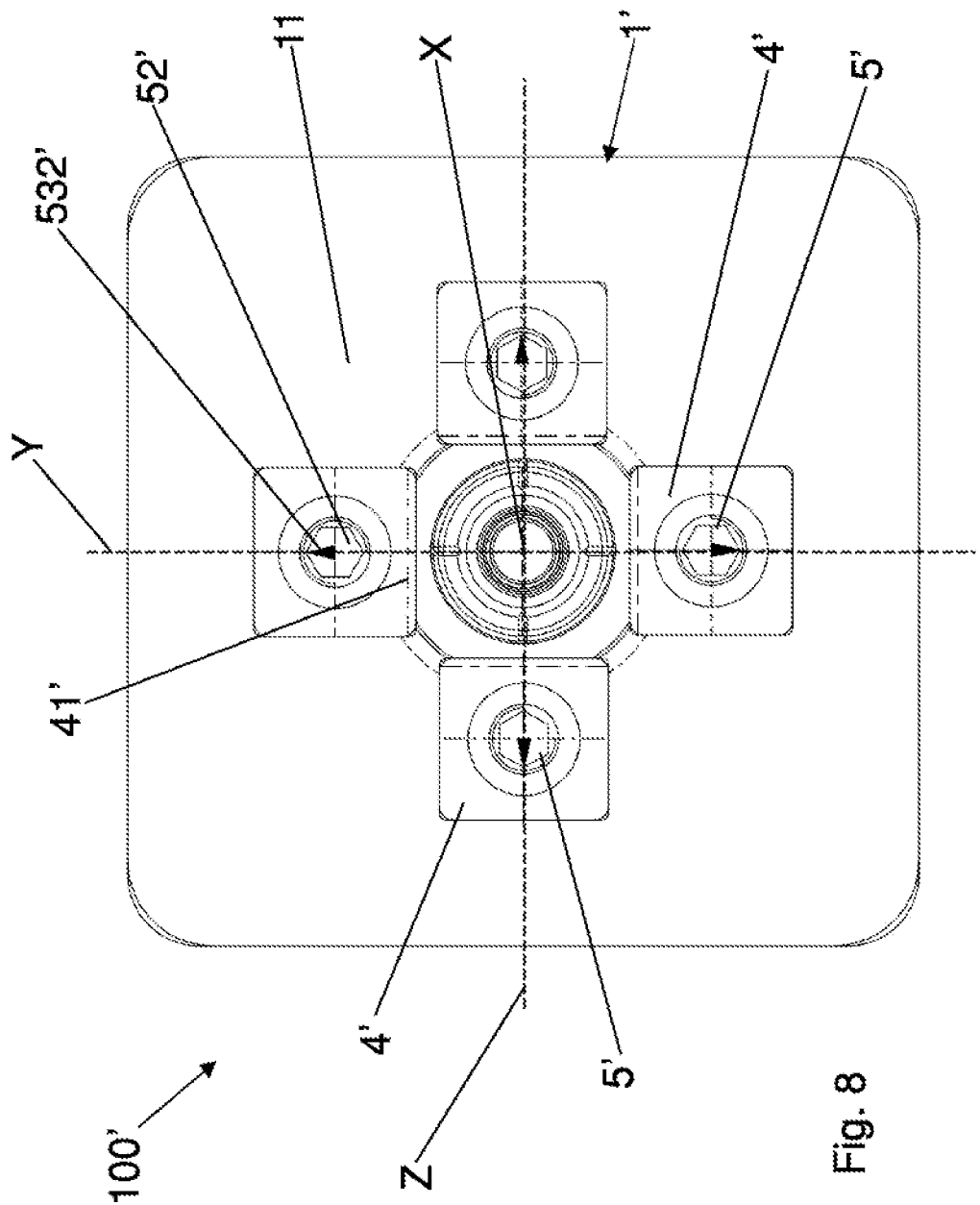
FIG. 8 shows a top plan view of some parts of the apparatus in FIG. 7.

In the example shown in FIGS. 7 and 8, face 42' (or surface portion) of each element 4', opposite to face 41' (or surface portion), is substantially parallel to axis X. The surface of body 1' in contact with said face 42' is also substantially parallel to axis X, and in particular is parallel to face 42'.

Figure 9:
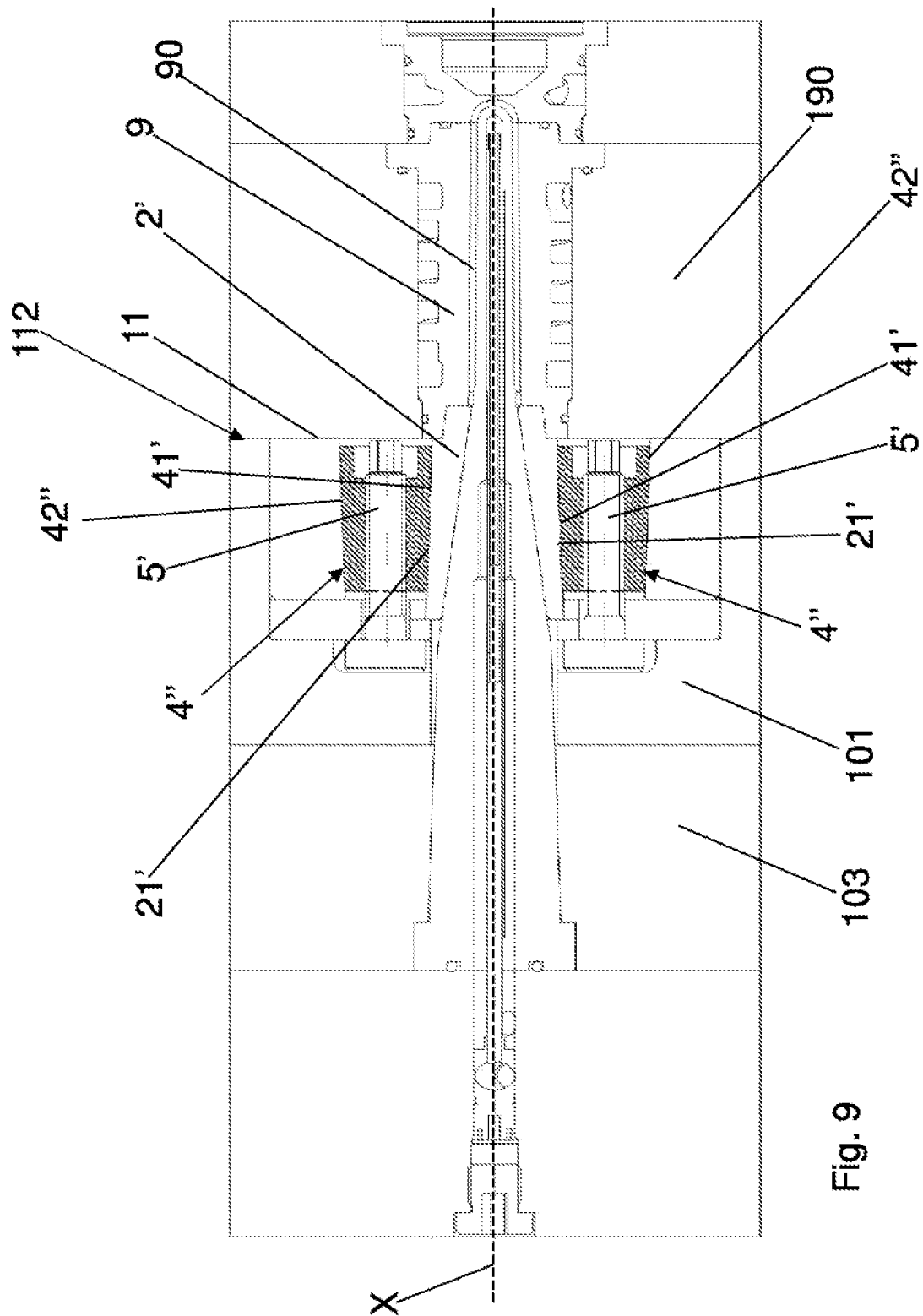
FIG. 9 shows a sectional view of some parts of another example of apparatus according to the invention.
Figure 10:
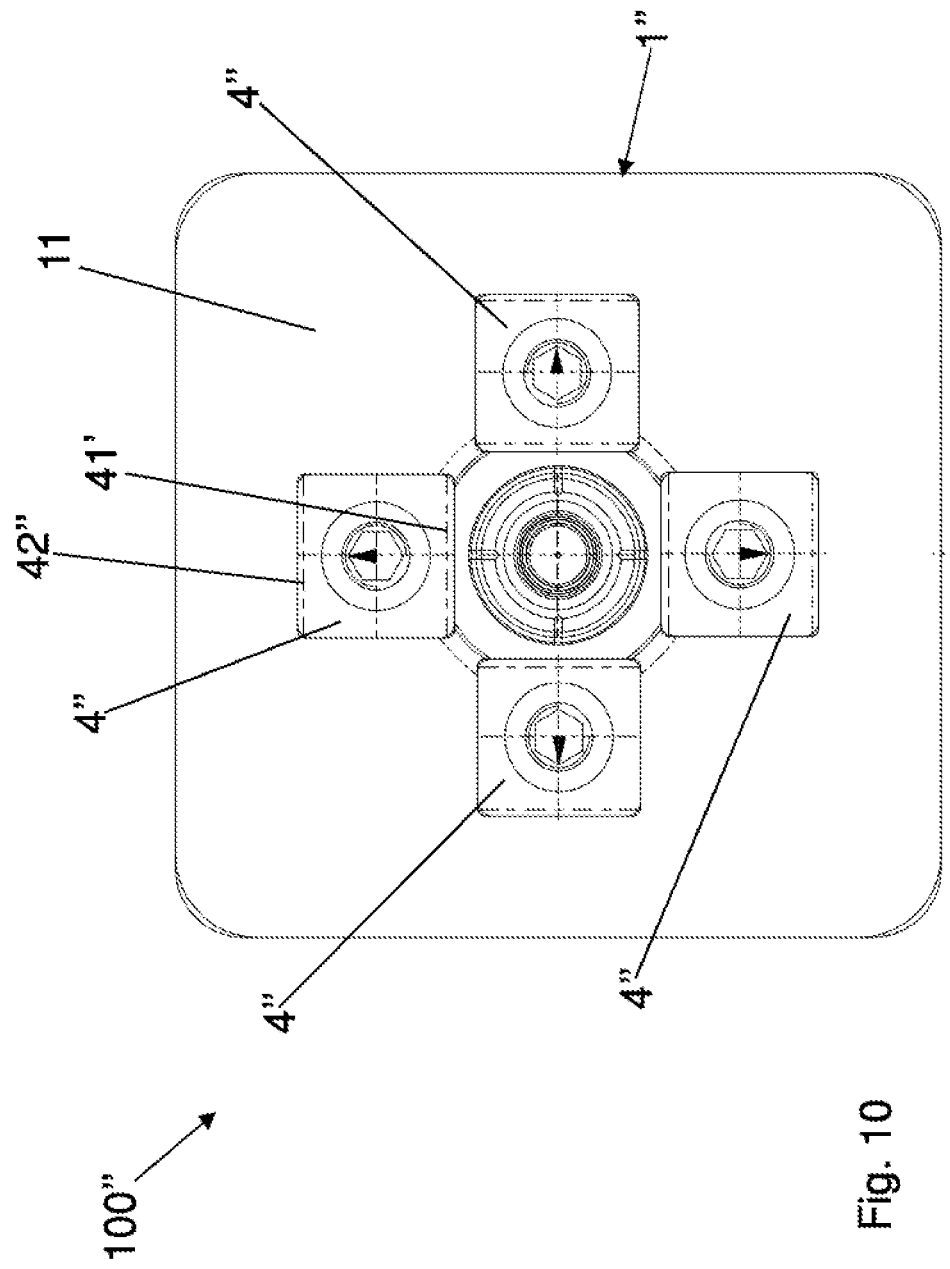
FIG. 10 shows a top plan view of some parts of the apparatus in FIG. 9.

In the example shown in FIGS. 9 and 10, each element 4" has a face 42" (or surface portion) opposite to face 41', which instead is inclined with respect to axis X. The tilt angle of face 42" is preferably the same as face 41'. The surface of body 1" in contact with said face 42" is also inclined with respect to axis X, and in particular is parallel to face 42". Face 41' and face 42" preferably diverge from each other towards the face 11 of body 1".

An advantage of this variant is that face 42" allows the reaction forces to be better unloaded.

The other features of body 1" and the elements 4" are the same as body 1' and the elements 4', respectively.

In all the embodiments, component 100, 100' can comprise a plurality of bodies 2, 2' (for example two bodies 2, 2'), each inserted in a same body 1, 1' and each having a plurality of said elements 4, 4' in contact therewith, in particular in order to adjust the position thereof. A respective core 3 can be inserted in each body 2, 2'.

As mentioned above, the invention also relates to a molding apparatus 110, 110' comprising one or more components 100, 100'.

The molding apparatus 110, 110' in particular comprises a cavity-support plate 190 having a face 192 facing said face 11 of said first body 1, 1', 1"; in particular wherein face 192 of the cavity-support plate 190 and said face 11 of said first body 1, 1', 1" are adapted to come into contact with each other in the closing configuration of the molding apparatus 110, 110', and to be spaced apart from each other in the opening configuration of the molding apparatus 110, 110'.

The molding apparatus 110, 110' in particular comprises a stripper plate 101 which defines part of said separation surface 112.

The stripper plate 101 and the cavity-support plate 190 are adapted to come into contact with each other in the closing configuration of the molding apparatus, and to be spaced apart from each other in the opening configuration of the molding apparatus.

The molding apparatus 110, 110' preferably comprises a plurality of bodies 2, 2'; a respective core 3 is inserted in each body 2, 2'.

Core 3, also called male, or punch, is the component which molds the inner surface of the molded item. In particular, the molding surface of core 3 is defined by the end portion of core 3 axially opposite to the base of core 3.

For each core 3, there is provided a respective body 9 delimiting a molding cavity 90 where core 3 can be inserted, in particular to mold the item. In particular, the end portion of core 3 and body 9 define a mold.

The aforesaid axis X is the longitudinal axis, in particular the central longitudinal axis, of core 3. Body 9 molds at least part of the external surface of the item, for example the outer side surface.

Advantageously, the position of each core 3, in particular the end portion (or molding portion) thereof with respect to the respective body 9, can be adjusted by means of the elements 4, 4' in contact with the respective body 2, 2'.

Thereby, any misalignment conditions between core 3 and body 9 can be corrected, in particular so that core 3 and body 9 are coaxial to each other.

Preferably, component 100, 100' (or the components 100, 100') is fastened to another component, in particular to plate 101, also called stripper plate 101 or stripping plate. In particular, the first body 1, 1', 1" is arranged in the stripper plate 101, in particular each first body 1, 1', 1" is arranged in a respective seat of the stripper plate 101.

The stripper plate 101 in particular has larger dimensions than each component 100, 100', in particular with respect to each first body 1, 1', 1".

Although it is preferable that the first body(ies) 1, 1', 1" be separate from the stripper plate 101, in particular for easier realization and maintenance, the first body 1, 1', 1" can also be the stripper plate.

The stripper plate 101 has a face which defines part of the aforesaid separation surface 112 of the molding apparatus, 110, 110' (also defined by the face(s) 11 of body (ies) 1, 1'). In particular, said face of the stripper plate 101 is preferably substantially coplanar with each face 11.

Each component 100, 100' is preferably fastened, in particular integrally fastened, to the stripper plate 101 by means of fastening means 108.

As mentioned above, the molding apparatus 110, 110' also comprises a cavity-support plate 190 where a plurality of bodies 9 is inserted.

Face 192 of the cavity-support plate 190 is preferably parallel to face(s) 11, that is to the aforesaid separation surface 112 at least defined by plate 101 and by the face(s) 11 of component(s) 100, 100'.

Apparatus 110, 110' is configured so that the stripper plate 101 and the cavity-support plate 190 can be moved towards and away from each other, parallel to axis X.

In particular, the stripper plate 101 can be displaced to move away, in particular separate, from the cavity-support plate 190 (in the opening configuration of the molding apparatus 110, 110'); and to move towards the cavity-support plate 190, in particular coming into contact therewith (in the closing configuration of the molding apparatus 110, 110').

Advantageously, when the stripper plate 101 and the cavity-support plate 190 are away from each other (that is in the opening configuration of the mold), the aforesaid adjustment of the position of core(s) 3 can be easily made, in particular of each single core 3 requiring said adjustment, without the need to disassemble other components of the apparatus.

Apparatus 100, 100' preferably, but not exclusively, also comprises a component called a gate insert 107 for each body 9. The molten plastic is injected into the molding cavity 90 through the gate insert 107. The gate insert 107 in particular is adapted to mold the bottom of the outer surface of the item.

It should be apparent that the gate insert 107 could also not be provided, and in this case, body 9 can be designed so as to also perform the function of gate insert.

The molding apparatus 110, 110' preferably also comprises a core-support plate 103 to which the cores 3 are constrained, in particular the rear portion (or base) of the cores 3, which is distal from the molding cavity 90, axially opposite to the tip of core 3.

The stripper plate 101 is arranged between the core-support plate 103 and the cavity-support plate 190. As mentioned above, the elements 4, 4', 4" preferably are arranged in the stripper plate 101.

In use, when the stripper plate 101 and the core-support plate 103 are in the opening configuration of the molding apparatus 110, 110', the stripper plate 101 and the bodies 2, 2' therewith translate along axis X towards the cavity-support plate 190, while the core-support plate 103 and the cores 3 remain fixed in position. Thereby, each body 2, 2' can slide the molded item with respect to the respective core 3, in particular by means of the respective portion 23.

The invention also relates to a method for adjusting the position of at least one core 3 in a molding apparatus 110, 110', wherein the adjustment of the position of at least one core 3 is carried out by means of said elements 4, 4', 4" in the opening configuration of the molding apparatus 110, 110' in which the cavity-support plate 190 and the stripper plate 101 of the molding apparatus 110, 110' are spaced apart from each other.

Said adjustment is preferably carried out by displacing at least a first element 4, 4', 4" of said plurality of elements in a first direction parallel to axis X, and at least a second element 4, 4', 4" of said plurality of elements in a second direction parallel to the axis X, the first direction and the second direction being opposite to each other; the first element and the second element preferably being opposite to each other.

Said adjustment is preferably carried out by acting on the elements 4, 4', 4" from the side of face 11, which defines part of the separation surface 112 between the stripper plate 101 and the cavity-support plate 190.

The core-support plate 103 is in contact with the stripper plate 101 in said opening configuration.

Below are some advantages of the present invention.

The adjustment of the position of the second body 2, 2' occurs by means of said elements 4, 4', 4", without the need to add or remove components, such as for example adjustment films.

In particular, the position of the second body 2, 2' can be adjusted as a function of the position, parallel to axis X, of said plurality of 4, 4', 4", within body 1, 1'. Therefore, there is no need to add or remove components in order to make the adjustment.

The adjustment of the position of core 3 can be carried out in particularly easy manner, in particular by virtue of the easy accessibility in order to displace the elements 4, 4', 4".

Indeed, the aforesaid face 11 of body 1, 1' is accessible in a configuration in which the mold is open, in particular in the opening position of the molding apparatus in which the stripper plate 101 and the cavity-support plate 190 are spaced apart from each other, without the need to separate other components of the molding apparatus 110, 110' from each other, in particular without the need to separate the core-support plate 103 and the stripper plate 101 from each other.

The inventors have found that the separation surface, in part defined by the face(s) 11, between the stripper plate 101 and the cavity-support plate 190, is accessible in a particularly easy manner, whereby they decided to make accessible the adjustment by means of the elements 4, 4', 4", from face 11, or in other words, from the side of face 11.

Moreover, the separation of the stripper plate 101 from the cavity-support plate 190 occurs during the regular operation of the molding apparatus 110, 110'.

There are other advantages when said second body 2, 2' is a stripper ring. One advantage associated with the feature can be appreciated, for example with respect to a positioning of centering elements of the core which act on the base of the core, for example arranged in the core-support plate. The stripper ring is a component which is relatively far from the base of the core (the core is constrained to the core-support plate at the base of the core). In other words, the stripper ring is closer to the tip of the core, which is the free end of the core of which the position is to be adjusted. Therefore, by adjusting the position of core 3 by means of the elements 4, 4', 4" adapted to displace the stripper ring (which in turn displaces core 3), the force momentum applied on core 3 has a relatively greater intensity because the point of application of the force on core 3 is further away from the base of the core (and therefore the arm is greater).

Moreover, generally stripper rings are made with particularly resistant materials.

The invention claimed is:

1. A component of a molding apparatus for producing hollow plastic items, in particular test tubes, syringes, preforms of containers or tubular bodies,
the component comprising:
a first body having a face defining part of a separation surface of the molding apparatus;
a second body, or stripper ring, inserted in the first body, adapted to be crossed along an axis by a core, and in particular to come into contact with the core;
a plurality of elements inserted in the first body, adapted to be displaced parallel to said axis;
wherein the second body has an outer surface comprising a plurality of inclined portions with respect to said axis;
and wherein each element of said plurality of elements has an outer surface comprising an inclined portion with respect to said axis, which is in contact with a respective inclined portion of the second body so that the position of the second body can be adjusted by means of said plurality of elements.

2. The component according to claim 1, wherein said second body is adapted to slide a molded item over the core, in particular to perform an extraction thereof; in particular wherein said second body comprises a portion adapted to come into contact with the molded item to slide it over the core, wherein said portion preferably projects with respect to said first body.

3. The component according to claim 1, wherein each element is inserted in a respective hole of said face; in particular wherein each hole is delimited partially by the first body and partially by the second body; and/or wherein each element is accessible, in particular in order to be displaced parallel to the axis, from the side of said face.

4. The component according to claim 1, wherein said face is adapted to face a cavity-support plate of the molding apparatus; in particular wherein said face is adapted to come into contact with said cavity-support plate.

5. The component according to claim 1, wherein each element of said plurality of elements is a screw; or wherein each element of said plurality of elements is connected to a respective screw by means of which it can be displaced parallel to the axis; preferably wherein each screw is accessible, in particular in order to be rotated, from the side of said face; wherein each screw is provided with an end portion adapted to engage with a tool for rotating it; wherein said end portion is proximal to said face; in particular wherein said end portion is accessible from the side of said face.

6. The component according to claim 1, wherein each screw is screwed in the first body,
wherein each screw comprises a frustoconical head which defines said inclined portion;
in particular wherein a rotation of each screw corresponds to a displacement of the screw parallel to the axis; preferably wherein the frustoconical head of each screw is inserted in a respective seat, and a side wall of each seat is defined partially by one of the inclined portions of the second body, and preferably partially by said first body.

7. The component according to claim 6, wherein each of the inclined portions of the second body is a frustoconical surface portion of the second body.

8. The component according to claim 1, wherein each element of said plurality of elements has an inner thread;
wherein a respective screw, in particular adapted to operate as worm-screw, is inserted in each element so that rotation of each screw corresponds to a displacement of a respective element parallel to said axis; preferably wherein a surface of each element is provided with a graduated scale.

9. The component according to claim 1, wherein each of said elements is arranged between the first body and the second body, along a radial direction with respect to the axis; wherein said plurality of elements comprises or consists of four elements arranged at the vertexes of a quadrilateral, in particular of a square or a rhombus.

10. The component-according to claim 1, comprising a stripper plate;
wherein said elements are arranged in the stripper plate, in particular between the stripper plate and said second body, along a radial direction with respect to the axis; preferably wherein said first body is arranged in said stripper plate or wherein said first body is said stripper plate.

11. The component according to claim 1, wherein the second body is mounted in the first body in floating manner; and/or wherein said inclined portions of the second body and each inclined portion of each element have a same tilt angle, in particular with respect to said axis; preferably wherein said tilt angle is less than 90°, preferably from 2 to 10°.

12. The component according to claim 1, comprising a plurality of second bodies, each inserted in the first body and each having a plurality of said elements in contact therewith, in particular in order to adjust the position thereof.

13. The component according to claim 1, wherein said separation surface is a separation surface with a cavity-support plate of the molding apparatus; and/or wherein said face of the first body is provided with a graduated scale for each element.

14. A molding apparatus for producing hollow plastic items, in particular test tubes, syringes, preforms of containers or tubular bodies,
comprising one or more components according to claim 1.

15. The molding apparatus according to claim 14, comprising one or more cores, each inserted in a respective second body, in particular in contact therewith; preferably wherein each core comprises a frustoconical portion in contact with a respective frustoconical inner surface of the second body.

16. The molding apparatus according to claim 14, comprising a cavity-support plate having a face facing said face of said first body; in particular wherein the face of the cavity-support plate and said face of said first body are adapted to come into contact with each other in the closing configuration of the molding apparatus, and to be spaced apart from each other in the opening configuration of the molding apparatus; preferably wherein the molding apparatus, comprises a stripper plate which defines part of said separation surface;
the stripper plate and the cavity-support plate being adapted to come into contact with each other in the closing configuration of the molding apparatus, and to be spaced apart from each other in the opening configuration of the molding apparatus.

17. The molding apparatus according to claim 14, comprising
a cavity-support plate;
at least one molding cavity arranged in the cavity-support plate;
at least one core;
a core-support plate, to which the rear portion of said at least one core is constrained, which is distal from the molding cavity;
a stripper plate arranged between the core-support plate and the cavity-support plate;
wherein the stripper plate is in contact with the core-support plate and with the cavity-support plate, in a closing configuration of molding apparatus;
wherein the stripper plate is adapted to be spaced apart from the cavity-support plate so that the molding apparatus takes on an opening configuration;
and wherein when the molding apparatus is in said opening configuration, the stripper plate is adapted to be spaced apart from the core-support plate, in particular by being displaced towards the cavity-support plate, so that said second body slides the molded item over a respective core.

18. The molding apparatus according to claim 14, comprising a plurality of second bodies; wherein a respective core is inserted in each second body;
wherein a respective body delimiting a molding cavity where the core can be inserted is provided for each core;
and wherein the position of each core with respect to the respective body can be adjusted by means of the elements in contact with the respective second body; preferably wherein each body is mounted in the cavity-support plate in floating manner.

19. A method for adjusting the position of at least one core in a molding apparatus according to claim 1,
wherein the adjustment of the position of at least one core is carried out by means of said elements in the opening configuration of the molding apparatus, in which the cavity-support plate and the stripper plate of the molding apparatus are spaced apart from each other.

20. The method according to claim 19, wherein said adjustment is carried out by displacing at least a first element of said plurality of elements in a first direction parallel to the axis and at least a second element of said plurality of elements in a second direction parallel to the axis, the first direction and the second direction being opposite to each other; and/or wherein said adjustment is carried out by acting on the elements on the side of the face, which defines part of the separation surface between the stripper plate and the cavity-support plate; and/or wherein the core-support plate is in contact with the stripper plate in said opening configuration.

* * * * *